Feb. 6, 1962 A. HEETMAN 3,020,353

ARRANGEMENT FOR AUTOMATIC TELEPHONE SYSTEMS

Filed July 23, 1957 2 Sheets-Sheet 1

INVENTOR
ALPHONSUS HEETMAN

BY
Frank R. Trifari
AGENT

Feb. 6, 1962 A. HEETMAN 3,020,353

ARRANGEMENT FOR AUTOMATIC TELEPHONE SYSTEMS

Filed July 23, 1957 2 Sheets-Sheet 2

INVENTOR
ALPHONSUS HEETMAN

BY Frank R. Trifari
AGENT

United States Patent Office 3,020,353
Patented Feb. 6, 1962

3,020,353

ARRANGEMENT FOR AUTOMATIC TELEPHONE SYSTEMS

Alphonsus Heetman, Hilversum, Netherlands, assignor to North American Philips Company Inc., New York, N.Y., a corporation of Delaware Filed July 23, 1957, Ser. No. 673,642
Claims priority, application Netherlands Aug. 16, 1956
3 Claims. (Cl. 179—18)

Figure 1:
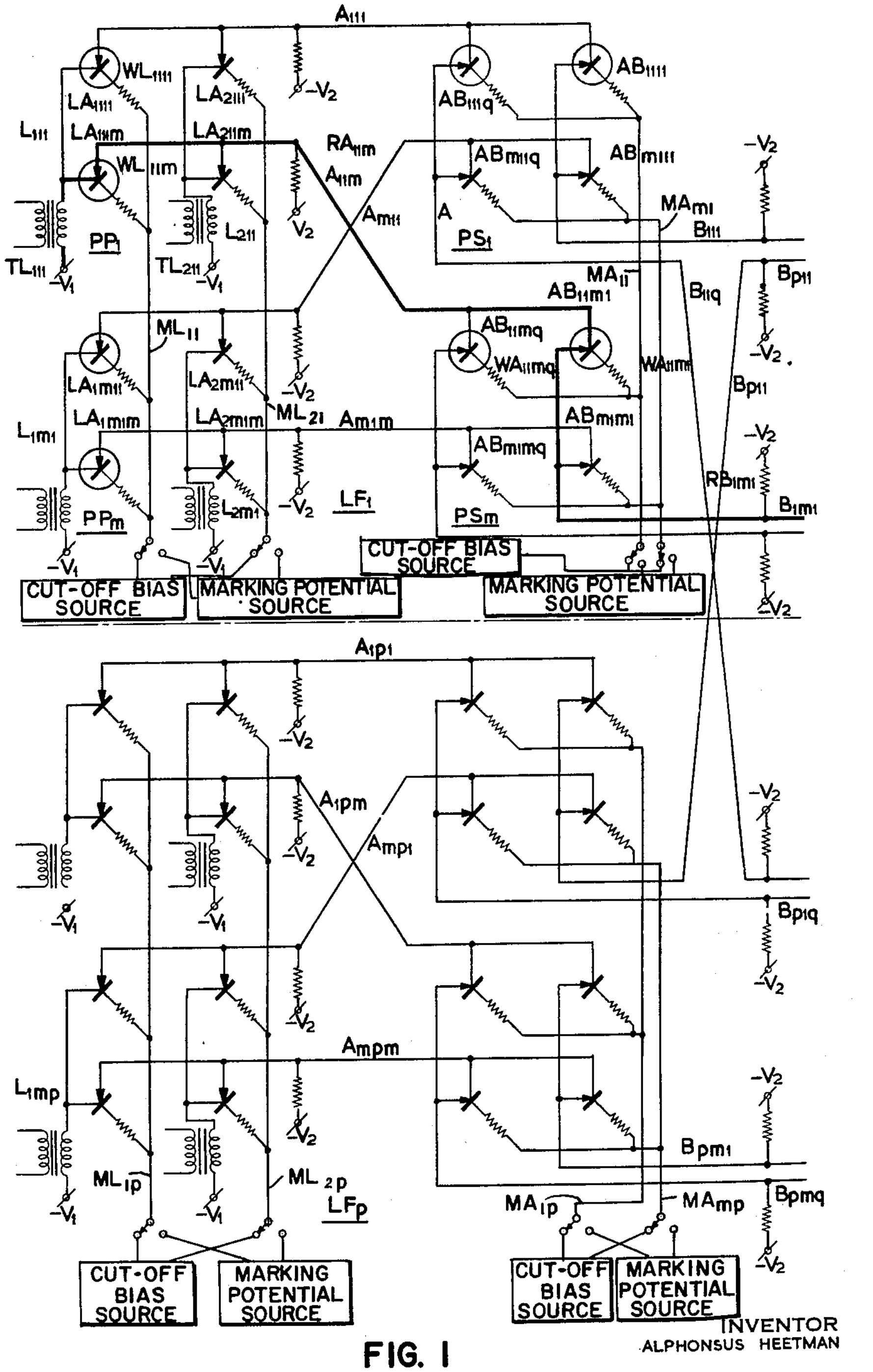

This invention relates to arrangements for automatic telephone systems intended for establishing a telephone connection between a given conductor of a first group and a given conductor of a second group.

Telephone systems are already known in which a plurality of groups of intermediate conductors are provided in a plurality of sequential stages and each conductor is connected via speech contacts to a plurality of conductors of the subsequent stage in a manner such that between each conductor of the first group and each conductor of the second group a plurality of connecting paths are possible, each extending via one intermediate conductor of each stage. Such systems comprise a marker testing the intermediate conductor in the various paths possible and selecting a path through free intermediate conductors. In a given system of this kind, the speech contacts are of the electronic type which are constituted by transistors having a collector-emitter-current gain factor higher than unity. The conductors of the first group and the intermediate conductors are in this system connected to the emitters of a plurality of transistors having their collectors connected to conductors of the subsequent stage, the various conductors being connected through impedances to voltage sources in a manner such that the transistors are normally cut-off. This system likewise comprises a marker for selecting a path between the given conductor of the first group and the given conductor of the second group. In this known system, the marker marks only the given inlet conductor and the given outlet conductor, whereafter the transistors so-to-say independently seek a free path. However, the performance of this system is not reliable, it being possible therein that the same conductor is connected to more than one conductor of an adjacent stage.

The present invention relates more particularly to a telephone system of the last-mentioned kind, but in which the marker marks all of the transistors in the path chosen by the marker. However, the required number of marking conductors is comparatively small. In the arrangement according to the invention, the bases of a plurality of transistors having their emitters connected to various conductors of the same stage and their collectors connected to conductors of the same group of the subsequent stage are connected through individual resistors to the same marking conductor, the marker for the purpose of marking the connecting path selected supplying marking voltages to the given conductor of the first group and to the marking conductors associated with the transistors having their collectors connected to conductors of a group of which a conductor in the selected path forms part, in a manner such that the transistors connecting together the conductors in the selected path being successively released, starting with the transistor which is connected to the given conductor of the first group. Due to the release of one transistor, the emitter-base path of the subsequent transistor in the path is prepolarised in the forward direction. The direct-current resistance of the impedance connected to the conductors of the second group is small with respect to the direct-current resistance of the impedances connected to the intermediate conductors and the conductors of the first group, so that upon release of the transistor connected to the conductor of the second group the conductors in the selected path assume a potential such that upon a subsequent marking none of the other transistors connected to these conductors can become conducting.

In order that the invention may be readily carried into effect, one embodiment will now be described more fully, by way of example, with reference to the accompanying drawings.

Figure 2:
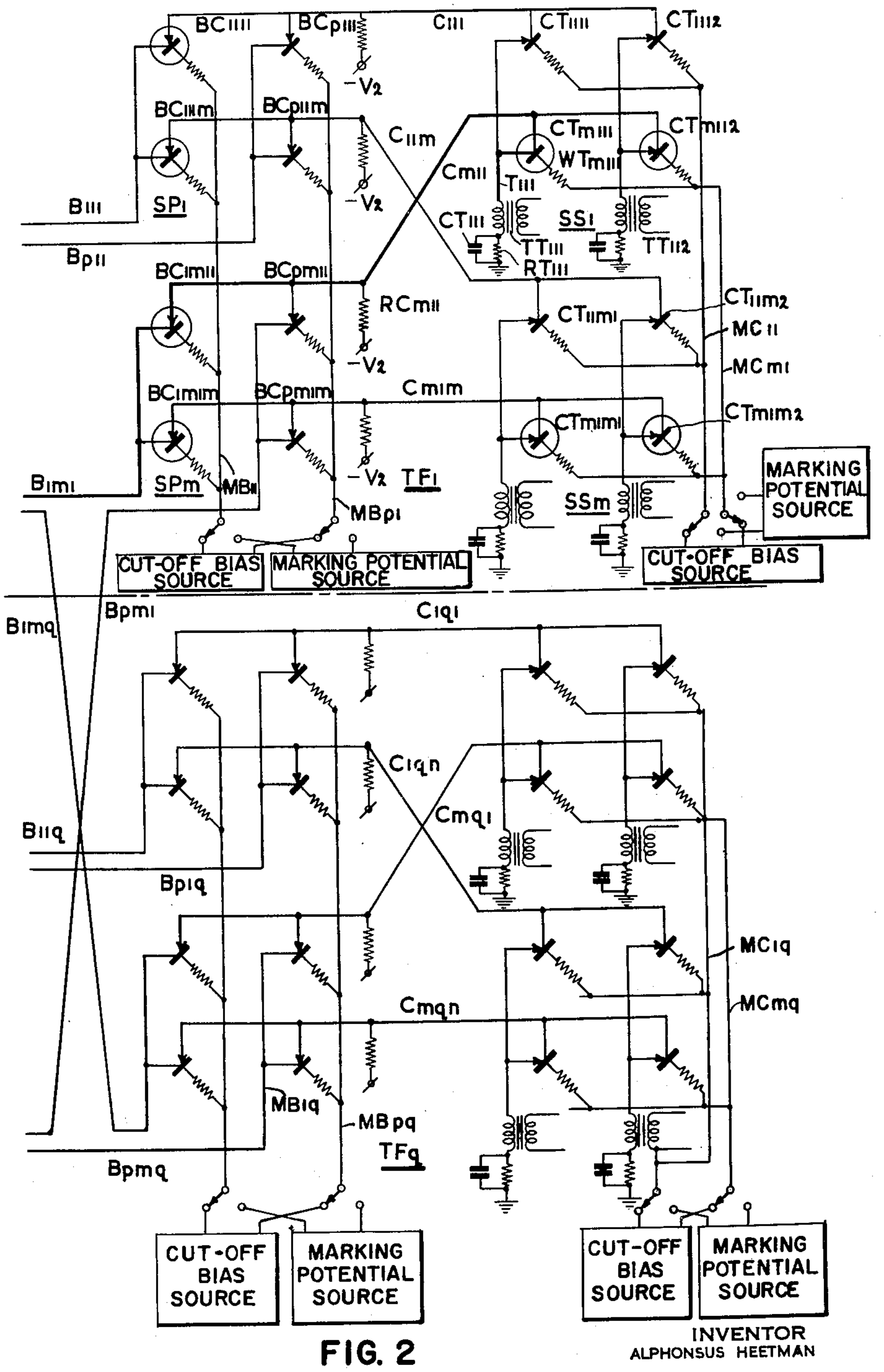

FIGS. 1 and 2 are to be laid side by side and show a wiring diagram of a kind such as used, for example, in telephone systems having co-ordinate switches and which in certain cases is indicated by the name "link system."

Such systems comprise a plurality of primary main connecting groups (line link frames) and a plurality of secondary main connecting groups (trunk link frames), which will briefly be indicated as "primary" and "secondary" frames, respectively. The number of primary frames in a telephone exchange having 10,000 subscribers is, for example, 20 and the number of secondary frames is 10.

FIG. 1 shows two primary frames LF1 and LF*p* and FIG. 2 shows two secondary frames TF1 and TF*q*. Each primary frame comprises a plurality (for example 10) of primary contact groups and a plurality (for example 10) of secondary contact groups. Thus, the primary frame LF1 comprises primary contact groups PP1 and PP*m* and secondary contact groups PS1 and PS*m*. The secondary frame TF1 comprises primary contact-groups SP1 and SP*m* and secondary contact groups SS1 and SS*m*. The primary contact groups in each frame are connected to the secondary contact groups by means of internal frame connections or intermediate conductors, in a manner such that each primary contact group is connected via one intermediate conductor to each secondary contact group. In the frame LF1, for example, the primary group PP1 is connected to the secondary group PS1 through a conductor A111 and to the secondary group PS*m* through a conductor A11*m*, the primary group PP*m* being connected through a conductor A*m*11 to the secondary group PS1 and through a conductor A*m*1*m* to the secondary group PS*m*. The significance of the various indices will appear hereinafter. In a similar manner, the primary contact groups SP1 and SP*m* of the secondary frame TF1 are connected to the secondary groups SS1 and SS*m* through conductors C111, C11*m*, C*m*11 and C*m*1*m*. The primary frames LF1 and LF*p* are connected to the secondary frames TF1 and TF*q* through inter-frame connections (junctors) or intermediate conductors in a manner such that each secondary contact group of each primary frame is connected via at least one conductor to one primary contact group of each secondary frame. Thus, between each primary frame and each secondary frame there are provided a plurality of connecting conductors at least equal to the number of secondary contact groups per primary frame or the number of primary contact groups per secondary frame, for example 10. Thus, the first secondary contact group PS1 of frame LF1 is connected to the first primary contact group SP1 of frame TF1 through a conductor B111 and to the first primary contact group of frame TF*q* through a conductor B11*q*, the $m^{th}$ secondary contact group PS*n* of frame LF1 being connected through a conductor B1*m*1 to the $m^{th}$ primary contact group SP*m* of frame TF1 and through a conductor B1*mq* to the $m^{th}$ primary contact group of frame TF*q*. A plurality of inlet conductors are connected to the secondary contact groups of each secondary frame. The contact group SS1 is connected, for example, to inlet conductors T111 and T112, which inlet conductors are connected via transformers, for example TT111, to further connecting means (not shown), for example connecting circuits, and connected to earth through a resistor RT111 shunted by a capacitor CT111. The primary contact groups of the primary frames are connected to outlet conductors. The primary contact group PP1 is connected, for example, to outlet conductors L111 and L211, which outlet conductors are coupled by means of transformers TL111 and TL211 to connecting means (not shown), for example subscribers lines. The outlet conductors are connected through a winding of each of these transformers to voltage sources —V1 each having a voltage of, for example, —10 volts. The number of outlet conductors per primary contact group is, for example, 70.

In each contact group the conductors of sequential stages are connected together via electronic speech contacts. These speech contacts are constituted by main current paths of transistors having a collector-emitter current gain factor greater than unity. Outlet conductor L111 is coupled, for example, via transistor LA1111 to intermediate conductor A111 and via transistor LA11*m* to conductor A11*m*. Similarly, conductor A111 is coupled via transistors AB111*q* and AB1111 to the conductors B11*q* and B111 etc. The emitters of the transistors are adjacent the input side and their collectors are adjacent the output side. Thus, between a given inlet conductor, for example T111, and a given outlet conductor, for example, L111, there are a plurality of different connecting possibilities, for example from inlet conductor T111 via transistor CT1111, intermediate conductor C111, transistor BC1111, conductor B111, transistor AB1111, conductor A111, and transistor RL1111 to conductor L111, or from conductor T111 via transistor CT*m*111, conductor C*m*11, transistor BC1*m*11, conductor B1*m*1, transistor AB11*m*1, conductor A11*m* and transistor LA11*m* to conductor L111. These connecting paths each extend via one intermediate conductor of each stage and hence via one C-conductor, one B-conductor and one A-conductor. The number of connecting paths possible between a given inlet conductor and a given outlet conductor is equal to the number of connecting possibilities between a primary frame and a secondary frame and hence at least equal to the number of secondary contact groups per primary frame or the number of primary contact groups per secondary frame.

The various connecting paths are fundamentally determined by 7 indices, viz:

(*a*) The number of the outlet line in the primary contact group of the relevant primary frame.
(*b*) The number of the primary contact group to which the outlet line is connected.
(*c*) The number of the primary frame to which the outlet line is connected.
(*d*) The number of the secondary contact group in the primary frame, which number is equal to the number of the primary contact group of the secondary frame to which the inlet line is connected.
(*e*) The number of the secondary frame to which the inlet line is connected.
(*f*) The number of the secondary contact group in the secondary frame of the inlet line.
(*g*) The number of the inlet line in this secondary contact group.

The outlet conductors are indicated in the drawing by the three first indices, and hence by L*abc*. The A-conductors are indicated by the indices, *b*, *c*, *d* and hence by A*bcd*. Similarly, the B-conductors are indicated by B*cde*, the C-conductors by C*def* and the inlet conductors by T*efg*. In a similar manner, the transistors by which the outlet conductors are coupled to the A-conductors are indicated by LA*abcd*. The transistors by which the A-conductors are coupled to the B-conductors are indicated by AB*bcde*. The transistors by which the A-conductors are coupled to the B-conductors are indicated by AB*bcde*. The transistors by which the B-conductors are coupled to the C-conductors are indicated by BC*cdef*. The transistors by which the C-conductors are coupled to the inlet conductors are indicated by CT*defg*. The outlet conductors are fully determined by the three first indices *a*, *b* and *c*. Similarly, the inlet conductors are fully determined by the three last indices *e*, *f* and *g*. As previously mentioned, a plurality of connecting paths are possible between a given inlet conductor and a given outlet conductor. A given connecting path is now determined by the index *d*.

The various intermediate conductors are connected through individual resistors, each having a value of, for example, 20,000 ohms, to voltage sources —V2 each having a voltage of, for example, —20 volts. Thus,, the conductor A11*m* is connected to voltage source —V2 through a resistor RA11*m*, the conductor B1*m*1 through a resistor RB1*m*1 and the conductor C*m*11 through a resistor RC*m*11. The bases of the transistors are connected through individual resistors, for example WL1111, WL111*m*, WA11*mq*, WA11*m*1, each having a value of, for example, 10,000 ohms, to marking conductors such as ML11, ML21, MA11, MA*m*1, etc. In each primary frame, the bases of all transistors connected to outlet conductors having the same index figure *a* are connected in the various contact groups to the same marking conductor. Thus, the bases of the transistors LA1111, LA111*m*; LA1*m*11, LA1*m*1*m*, the collectors of which are connected to the outlet conductors L111 and L1*m*1, respectively, of which the index *a*, that is to say the line number in the primary contact group, is equal to unity, are connected to the marking conductor ML11. The bases of the transistors LA2111, LA211*m*, LA2*m*11, LA2*m*1*m*, which are connected to the outlet conductors L211 and L2*m*1, the index figure *a* of which is equal to 2, are coupled to the common marking conductor ML21. In the secondary contact groups of each primary frame, the bases of the transistors having the same index *b* and which are thus connected to A-conductors leading to the same primary contact group, are connected to a common marking conductor. Thus, the bases of the transistors AB111*q*, AB1111, AB11*mq*, AB11*m*1, which have their collectors connected to the conductors A111 and A*m*11, giving access to the first primary contact group PP1 of the frame LF1, are connected to the marking conductor MA11. In a similar manner, the bases of the transistors AB1111, AB*m*111, AB*m*1*mq* and AB*m*1*m*1 are connected to the marking conductor MA*m*1. In the primary contact groups of each secondary frame, the bases of the transistors which have their collectors connected to B-conductors leading to the same primary frame and thus having the same index *c*, are connected to the same marking conductor. Thus, the bases of the transistors BC1111, BC111*m*, BC1*m*11, BC1*m*1*m*, which have their collectors connected to the intermediate conductors B111 and B1*m*1 connected to the primary frame LF1, are coupled to the marking conductor MB11. The bases of the transistors BC*p*111, BC*p*11*m*, BC*pm*11 and BC*pm*1*m*, which are connected to the conductors B*p*11 and B*pm*1, leading to the primary frame LF*p*, are coupled to the marking conductor MB*p*1. In each secondary contact group of each secondary frame, the bases of the transistors having their collectors connected to C-conductors which are connected to the same primary contact group and which have the same index *d*, are coupled to the same marking conductor. Thus, the bases of the transistors CT1111, CT1112, CT11*m*1 and CT11*m*2, which are connected to the conductors C111, C11*m* leading to the first primary contact group of frame TF1, are coupled to the marking conductor MC11. The bases of the transistors CT*m*111, CT*m*112, CT*m*1*m*1 and CT*m*1*m*2 are connected to marking conductor MC*m*1.

The marking conductors are indicated by two indices, for example, the marking conductors MC by the index *a*, which indicates the number of the outlet line in the primary contact group which can be reached through the corresponding transistors, and the index *c*, which indicates the number of the primary frame concerned. Similarly, the marking conductors MA have associated with them the indices *b* and *c*, which indicate the number of the primary contact group which can be reached through the transistors concerned and the number of the primary frame. Similarly, the marking conductors MB have associated with them the indices *c* and *e* and the marking conductors MC the indices *d* and *e*.

The marking conductors normally each have a voltage of +5 volts. In the rest condition of the circuit, the outlet conductors each have a voltage of −10 volts, the A-, B- and C-conductors a voltage of −20 volts, whereas the inlet conductors have earth potential. In this case, all of the transistors are cut-off, since all of the blocking layers are pre-polarised in the cut-off direction. To establish a telephone connection between a given inlet conductor, for example T111, and a given outlet conductor, for example L111, the transistors located in a given connecting path between these conductors must be made conducting. The establishing of this connection is controlled by a control device or marker (not shown) in which the characteristic data of the inlet line and the outlet line, this is to say the last three and the first three of the above-mentioned indices, are recorded. The marker tests in a manner not shown, for example, as usually employed in systems having crossbar switches, with the aid of said data what intermediate conductors of the connecting paths concerned are free. Free intermediate conductors have a voltage of −20 volts whereas busy intermediate conductors have a voltage of about −10 volts, as will appear hereinafter. The marker can ascertain whether a conductor is free or busy by testing the voltage of the lines. It is alternatively possible to distinguish between busy and free conductors by utilising the fact that a direct current flows through a busy conductor whereas free conductors do not carry current. In the assumed case in which a connection between the inlet conductor T111 and the outlet conductor L111 is to be built up, the marker tests the intermediate conductors A111, B111, C111 and A11*m*, B1*m*1, C*m*11, respectively, selecting a path in which all of the intermediate conductors in sequential stages are simultaneously free, for example the path via the intermediate conductors A11*m*, B1*m*1 and C*m*11, which path is indicated in thick lines in the figure. Thus, in this path, the transistors CT*m*111, BC1*m*11, AB11*m*1 and LA111*m* must be released. For this purpose, the marker marks the various transistors by reducing the voltage of the marking conductors ML11, MA11, MB11 and MC*m*1 to +2 volts. This results in marking of the transistors LA1111, LA111*m*, LA1*m*11 and LA1*m*1*m*, this is to say all of the transistors in the primary frame LF1, which have their collectors connected to outlet lines having the same index number *a* as the given outlet line L111. Similarly, in the secondary contact group of frame LF1, all of the transistors (AB1111, AB111*q*, AB11*mq*, AB11*m*1) are marked, through which a connection could be established with the primary group PP1 to which the outlet line L111 is connected (index *b*). In the secondary frame TF1, the transistors BC1111, BC111*m*, BC1*m*11 and BC1*m*1*m* are marked, this is to say all of the transistors through which a connection between the primary frame LF1 and the secondary frame TF1 could be established. Furthermore, in the secondary frame, the transistors CT*m*111, CT*m*112, CT*m*1*m*1 and CT*m*1*m*2 are marked, that is to say all of the transistors through which within the frame TF1 a connection with the primary contact group S*pm* could be established. The various marked transistors are indicated by circles in the figure. However, the transistors are not released by applying to them marking voltages, the emitter base paths still being pre-polarized in the cut-off direction. The marker marks the transistor CT*m*111 in addition by other means, viz. by increasing the voltage on the inlet conductor to +3 volts. This may be effected, for example, by applying an alternating voltage to transformer TT111, so that the voltage on the inlet conductor T111 periodically increases to +3 volts. Since the base voltage is +2 volts, the emitter-base path of transistor CT*m*111 is pre-polarized in the forward direction and this transistor becomes conducting, a current starting to flow from earth via resistor RT111, winding of transformer TT111, emitter-collector path CT*m*111, conductor C*m*11 and resistor RC*m*11 to the voltage source −V2. Since, as previously mentioned the transistors have a collector-emitter current gain factor greater than unity, the collector current is greater than the emitter current and the difference current flows through the base resistor RT*m*111 such that the base voltage decreases and the transistor remains conducting even after the marking voltages have been removed.

The transistors CT*m*112, CT*m*1*m*1 and CT*m*1*m*2 are not released when the marking conductors MC*m*1 are marked, since the emitter voltages are equal to earth potential or, as will appear hereinafter, are negative if the emitter is connected to a busy C-conductor. The transistor CT1111 is not released either, since its base is not marked and hence its emitter remains negative with respect to the base. When the transistor CT*m*111 is released, the voltage of conductor C*m*11 increases to a value substantially equal to the voltage of the inlet conductor T111, since the resistor RCM11 has a high value with respect to resistor RT111 and the internal resistance of transistor CT*m*111 in the released condition is very low. Consequently, the voltage on the emitter of transistor BC1*m*11 exceeds the voltage of the base, so that this transistor also becomes conducting and the voltage of conductor B1*m*1 increases to a value a little higher than the voltage of the inlet conductor T*m*11, since the resistor RB1*m*1 likewise has a comparatively high value with respect to resistor TR111. As a result thereof, the base-emitter path of transistor AB11*m*1 in turn is pre-polarized in the forward direction, so that this transistor becomes conducting and the voltage of conductor A11*m* increases to a value substantially equal to the voltage of inlet conductor T111. Consequently, the voltage on the emitter of transistor LA111*m* exceeds that of the base, so that at last this transistor is also released. During this process, none of the other marked transistors indicated by circles can be released, since the voltages of their emitters and their collectors invariably remain negative with respect to that of their bases as a result of the fact that the voltage of the emitters are not increased in contradistinction with the transistors located in the connecting path selected. When transistor LA111*m* is released, the voltage of the conductors A11*m*, B1*m*1, and C*m*11 decreases to approximately −10 volts (−V1) due to the resistance of the winding of transformer TL111 through which the collector of transistor LA111*m* is connected to voltage source −V1 being comparatively low with respect to the resistance RT111 connected to inlet conductor T111. After the marking voltages are removed the transistors LA111*m*, AB11*m*1, BC1*m*11 and CT*m*111 remain conducting due to the presence of the resistor in their base circuits. The desired connection is thus established.

As previously explained, during the building up of the connection, the voltages of the conductors C*m*11, B1*m*1 and A11*m* are successively increased from −V2 to substantially the voltage of inlet conductor T111, so that each time a subsequent transistor in the circuit can become conducting, whilst upon release of the last transistor La111*m* the voltage of the conductors is again decreased to about −V1. This step is important since during the existence of the described connection another transistor connected to one of the intermediate conductors concerned is thus prevented from becoming conducting when marking voltages are applied to the marking conductors for establishing another connection. If, for example, a subsequent connection must extend through conductor C*m*1*m*, transistor BC*pm*1*m* and conductor B*pm*1, the voltage of marking conductor MB*p*1 is decreased to +2 volts in the manner previously described, so that transistor BC*pm*1*m* is released when the potential of conductor C*m*1*m* increases. Transistor BC*pm*11, the base of which is connected to marking conductor MB*p*1 and the emitter of which is connected to conductor C*m*11 in the existing connecting path, cannot be released then since the potential of conductor C*m*11 is greatly negative with respect to that of marking conductor MB*p*1. If upon release of transistor LA111*m* the voltage of the intermediate conductors A11*m*, B1*m*1, C*m*11 were not greatly decreased, but have remained approximately equal to the no-load potential of inlet conductor T111, this is to say about earth potential, transistor BC*pm*11 would have been released upon marking of marking conductor MB*p*1.

When the call is over, the connection may be interrupted by supplying a negative pulse via transformer TT111 to the emitter of transistor CT*m*111, so that this transistor is cut-off. The voltage of conductor C*m*11, which is connected via resistor RC*m*11 to the voltage source −V2, then decreases below the voltage of the base of transistor BC1*m*11, so that this transistor is also cut-off. In a similar manner, the transistors AB11*m*1 and LA111*m* are likewise cut-off.

It is alternatively possible to utilise two or more markers simultaneously, if traffic conditions make this desirable. However, in this case, steps must be taken to ensure that different markers cannot mark simultaneously transistors the emitters of which are connected to the same conductor. Thus, for example, a marking voltage must not be applied at the same time to the marking conductors MB11 and MB*p*1 or MA11 and MA*m*1. However, it is not objectionable for two markers to mark simultaneously transistors in different frames.

What is claimed is:

1. An automatic telephone system comprising a first group of conductors, a second group of conductors, a plurality of intermediate groups of conductors, a first plurality of transistors each having collector, base and emitter electrodes, groups of said emitter electrodes being respectively connected to conductors of said first group and groups of said collector electrodes being respectively connected to conductors of a first one of said intermediate groups, a second plurality of transistors each having collector, base and emitter electrodes, groups of said last-named emitter electrodes being respectively connected to conductors of a last one of said intermediate groups and groups of said last-named collector electrodes being respectively connected to conductors of said second group, further pluralities of transistors each having emitter electrodes connected in groups to respective conductors of a preceding one of said intermediate groups of conductors and collector electrodes connected in groups to respective conductors of a succeeding one of said intermediate groups of conductors, whereby a conductor of said first group can be connected to a conductor of said second group via a choice of conductors of said intermediate groups by rendering selected transistors conductive, means for biasing all of said emitter electrodes with respect to all of said base electrodes so as to render all of said transistors normally non-conductive, and marking means connected to apply a marking voltage to the base electrode of at least one transistor in each of said plurality of transistors so as to render selected transistors consecutively conductive for establishing a connection between a selected conductor of said first group and a selected conductor of said second group, the conductors of said second group having a D.-C. return resistance which is lower in value than the D.-C. return resistances of the conductors of said intermediate and first groups of conductors thereby to insure that no other transistors which are connected to the conductors forming said connection will become conductive upon subsequent applications of marking voltage.

2. An automatic telephone system for establishing a connection between a given conductor of a first group of conductors and a given conductor of a second group of conductors, comprising a plurality of intermediate groups of conductors arranged in a plurality of sequential stages between said first and second groups, a plurality of transistors each having collector, base and emitter electrodes, said transistors being arranged in groups between each sequential pair of said groups of conductors, each conductor of said first and intermediate groups of conductors being connected to a plurality of emitters of the succeeding group of transistors, each conductor of said second and intermediate groups of conductors being connected to a plurality of collectors of the preceding group of transistors, whereby a plurality of connecting paths are possible between each conductor of said first group and each conductor of said second group, a source of a marking potential, a plurality of marking conductors for each said stage, resistor means connecting a common marking conductor to the bases of the transistors of each stage having emitters connected to different collectors of the preceding stage and collectors connected to the same emitters of the succeeding stage, means selectively connecting said marking conductors to said source, means connecting said source to said given conductor of said first group of conductors, and means connected to said intermediate conductors for normally biasing said transistors to a cut-off condition.

3. An automatic telephone system for establishing a connection between a given conductor of a first group of conductors and a given conductor of a second group of conductors, comprising a plurality of transistors each having a collector, base and emitter electrode, said transistors being arranged in a plurality of sequential stages of a plurality of transistors each between said first and second groups of conductors, each conductor of said first conductor group being connected to a plurality of emitters of the succeeding stage of transistors, each conductor of said second conductor group being connected to a plurality of collectors of the preceding stage of transistors, means connecting groups of collectors of each said stage to groups of emitters of the next succeeding stage, whereby a plurality of conductive paths are possible between each conductor of said first conductor group and each conductor of said second group, a source of a marking potential, a plurality of marking connections for each said stage, resistance means connecting said bases to said marking conductors, with the bases of transistors having their emitters connected to different preceding stage collectors and their collectors connected to common succeeding stage emitters being connected to a common marking conductor, means selectively connecting said marking conductors to said source, means connecting said given conductor of said first group of conductors to said source, and means normally biasing said transistors to a cut-off condition.

References Cited in the file of this patent

UNITED STATES PATENTS

| | | |
|---|---|---|
| 2,763,722 | Six et al. | Sept. 18, 1956 |
| 2,769,865 | Faulkner | Nov. 6, 1956 |
| 2,779,822 | Ketchledge | Jan. 29, 1957 |
| 2,780,674 | Six et al. | Feb. 5, 1957 |
| 2,857,470 | Faulkner | Oct. 21, 1958 |
| 2,876,285 | Bjornson et al. | Mar. 3, 1959 |